US012633437B2

(12) United States Patent
Kim et al.

(10) Patent No.: US 12,633,437 B2
(45) Date of Patent: May 19, 2026

(54) SOFT MAGNETIC IRON-BASED POWDER AND PREPARATION METHOD THEREFOR, AND SOFT MAGNETIC COMPONENT

(71) Applicant: POSCO CO., LTD, Pohang-si (KR)

(72) Inventors: Hyungjin Kim, Seoul (KR); Seil Lee, Pohang-si (KR); Jeasook Chung, Seoul (KR)

(73) Assignee: POSCO, Pohang-si (KR)

( * ) Notice: Subject to any disclaimer, the term of this patent is extended or adjusted under 35 U.S.C. 154(b) by 497 days.

(21) Appl. No.: 18/012,863

(22) PCT Filed: Jan. 15, 2021

(86) PCT No.: PCT/KR2021/000620
§ 371 (c)(1),
(2) Date: Dec. 23, 2022

(87) PCT Pub. No.: WO2022/030709
PCT Pub. Date: Feb. 10, 2022

(65) Prior Publication Data

US 2023/0268106 A1 Aug. 24, 2023

(30) Foreign Application Priority Data

Aug. 7, 2020 (KR) ........................ 10-2020-0099230

(51) Int. Cl.

| | |
|---|---|
| ***H01F 1/147*** | (2006.01) |
| ***B22F 9/08*** | (2006.01) |
| ***H01F 1/24*** | (2006.01) |

(52) U.S. Cl.
CPC .......... *H01F 1/14766* (2013.01); *B22F 9/082* (2013.01); *H01F 1/24* (2013.01); *B22F 2301/35* (2013.01); *B22F 2304/10* (2013.01)

(58) Field of Classification Search
CPC .... H01F 1/14766; H01F 1/24; H01F 41/0246; H01F 1/33; H01F 3/08; B22F 9/082; B22F 2301/35; B22F 2304/10; B22F 1/05; B22F 1/16; B22F 1/17; C22C 33/0264; C22C 38/04; C22C 38/06; C22C 38/02; C22C 2202/02
See application file for complete search history.

(56) References Cited

U.S. PATENT DOCUMENTS

| | | | | |
|---|---|---|---|---|
| 2010/0038580 | A1 | 2/2010 | Ye et al. | |
| 2012/0229245 | A1* | 9/2012 | Watanabe ................ | H01F 1/24 252/62.55 |
| 2014/0132383 | A1 | 5/2014 | Matsuura et al. | |
| 2015/0371746 | A1 | 12/2015 | Takashita et al. | |
| 2016/0307679 | A1 | 10/2016 | Taheri et al. | |
| 2020/0234876 | A1 | 7/2020 | Saito et al. | |

FOREIGN PATENT DOCUMENTS

| | | | |
|---|---|---|---|
| CN | 101615465 | A | 12/2009 |
| CN | 102596453 | A | 7/2012 |
| CN | 102789859 | A | 11/2012 |
| CN | 108183012 | A | 6/2018 |
| CN | 110997187 | A | 4/2020 |
| JP | S60-204833 | A | 10/1985 |
| JP | 2004-156134 | A | 6/2004 |
| JP | 2008-195986 | A | 8/2008 |
| JP | 2012-9825 | A | 1/2012 |
| JP | 2012-238828 | A | 12/2012 |
| JP | 2012-238841 | A | 12/2012 |
| JP | 2016-526093 | A | 9/2016 |
| KR | 10-2012-0068914 | A | 6/2012 |
| KR | 10-2014-0012126 | A | 1/2014 |
| KR | 10-2019-0078228 | A | 7/2019 |
| WO | 2016/140113 | A1 | 9/2016 |
| WO | 2019/031399 | A1 | 2/2019 |

OTHER PUBLICATIONS

International Search Report dated May 10, 2021 issued in International Patent Application No. PCT/KR2021/000620 (with English translation).
The Extended European Search Report dated Dec. 1, 2023 issued in European Patent Application No. 21853907.0.
Supplementary European Search Report dated Dec. 19, 2023 issued in European Patent Application No. 21853907.0.
(Continued)

*Primary Examiner* — Adil A. Siddiqui
(74) *Attorney, Agent, or Firm* — Morgan Lewis & Bockius LLP

(57) ABSTRACT

Disclosed are a soft magnetic iron-based powder, a preparation method therefor, and a soft magnetic component, which are applicable to various industrial fields such as a core of a motor. According to an embodiment of the disclosed soft magnetic iron-based powder, the powder comprises, in wt %, more than 2% of Si, more than 0.02% of Al, more than 0.05% of Mn, more than 0% and less than 0.1% of O, and the balance being Fe and unavoidable impurities, and satisfies [Si]/[Al]>2, wherein the difference in [Si]+[Al]+[Mn] between $D_{10}$ and $D_{90}$ may be less than 10 wt %. [Si], [Al], and [Mn] represent wt % of respective elements.

4 Claims, No Drawings

(56) References Cited

OTHER PUBLICATIONS

Office Action dated Feb. 21, 2024 for corresponding Japanese Patent Application No. 2023-504802 (see English translation).
Japanese Office Action dated Aug. 20, 2024 issued in Japanese Patent Application No. 2023-504802 (with English translation).
Chinese Office Action dated Aug. 30, 2025 issued in Chinese Patent Application No. 202180048219.7 (with English translation).
Chinese Office Action dated Apr. 2, 2026 issued in Chinese Patent Application No. 202180048219.7 (with English translation).

* cited by examiner

SOFT MAGNETIC IRON-BASED POWDER AND PREPARATION METHOD THEREFOR, AND SOFT MAGNETIC COMPONENT

CROSS-REFERENCE OF RELATED APPLICATIONS

This application is the U.S. National Phase under 35 U.S.C. § 371 of International Patent Application No. PCT/KR2021/000620, filed on Jan. 15, 2021 which claims priority to and the benefit of Korean Application No. 10-2020-0099230 filed on Aug. 7, 2020, the entire contents of which are incorporated herein by reference.

TECHNICAL FIELD

The present disclosure relates to a soft magnetic iron-based powder and a preparation method therefor, and a soft magnetic component.

BACKGROUND ART

Soft magnetic materials are used in inductors of electric appliances, stator parts or rotor parts of motors or electric generators for rotational drive, actuators, sensors, transformer cores, and the like. Soft magnetic materials may be manufactured by stacking electrical steel sheets. Among the soft magnetic materials, a soft magnetic composite (SMC) is manufacturing by coating soft magnetic iron-based powder with an insulating material, and compaction sintering the coated powder with a lubricant, a binder, or the like at a high temperature. The SMC is advantageous in that a three-dimensional electromagnetic field may be designed thereby, unlike a two-dimensional method in which electrical steel sheets are stacked, and complexity may considerably be increased due to high degrees of design freedom.

However, although the SMC has low iron loss and superior magnetic properties in a high frequency range of 10 kHz or higher compared to a material manufactured by stacking electrical steel sheets, but has a high iron loss in a low frequency range of 1000 Hz or less where motors are mainly driven compared to the material manufactured by stacking electrical steel sheets. Therefore, in order to use the SMC as a material for a motor, or the like, it is important to reduce the iron loss in a frequency range of 1000 Hz or less iron loss.

Iron loss is broadly classified into hysteresis loss and eddy current loss. Hysteresis loss refers to a loss occurring when a magnetic material is magnetized by a change in the electromagnetic field caused by AC electricity, and eddy current loss refers to a loss occurring when an induction current is generated by a change in an electromagnetic field caused by AC electricity. In general, while the hysteresis loss is important at a low frequency, the eddy current loss accounts for most of the iron loss at a high frequency. While the SMC has a low iron loss at a frequency of 10 kHz or higher due to superior eddy current loss properties to thin sheets, the use thereof is limited at a frequency of 1000 Hz or less due to poor hysteresis properties.

Assuming that the grain size in a metal is Gs, the hysteresis loss is proportional to $1/(\sqrt{Gs})$, and the eddy current loss is proportional to $(\sqrt{Gs})$. Thus, an optimal grain size range should be appropriately adjusted to reduce the iron loss. The optimal grain size is affected by specific resistance of a material, and the higher the specific resistance is, the smaller the iron loss is. This is related to a phenomenon that the eddy current decreases as the specific resistance of a material increases. That is, the higher the resistance is, the lower the iron loss is.

To increase resistance, a method of coating iron-based powder particles of the SMC with an insulating material has been known. For example, Patent Documents 1, 2, and 3 disclose techniques of forming insulation coating using inorganic materials. Coating with an organic material is disclosed, for example, in Patent Document 4. Coating with both inorganic and organic materials is disclosed, for example, in Patent Documents 5, 6, and 7. Based on these documents, iron-based powder particles are coated with an iron phosphate layer and a thermoplastic material.

However, these methods are disadvantageous in terms of manufacture of product and costs because a separate insulating material should be used for coating and a binder should be added. Particularly, in the case of coating with a separate insulating material, it is difficult to uniformly control the thickness of the coating layer of each powder particle, and it is difficult to select an appropriate insulating material in consideration of physical/chemical reaction between the powder and the insulating material. Also, since a proportion of iron is lowered in a material by a thickness of the insulating material formed on the powder, there may be problems of a decrease in energy density per unit volume and a decrease in saturation magnetic flux.

In conventional iron-based powder and components manufactured therefrom, there is a need to develop a soft magnetic iron-based powder having a low iron loss in a frequency range of 1000 Hz or less and a preparation method therefor, and a soft magnetic component.

Also, there is a need to develop a method for efficiently increasing resistance of an iron-based powder without using an insulating material which has been conventionally used to coat the iron-based powder to increase resistance.

(Patent Document 0001) U.S. Pat. No. 6,309,748
(Patent Document 0002) U.S. Pat. No. 6,348,265
(Patent Document 0003) U.S. Pat. No. 6,562,458
(Patent Document 0004) U.S. Pat. No. 5,595,609
(Patent Document 0005) U.S. Pat. No. 6,372,348
(Patent Document 0006) U.S. Pat. No. 5,063,011
(Patent Document 0007) DE U.S. Pat. No. 3,439,397

DISCLOSURE

Technical Problem

To solve the above-described problems, provided is a soft magnetic iron-based powder having a low iron loss in a frequency range of 1000 Hz or less and a preparation method therefor, and a soft magnetic component.

Technical Solution

In accordance with an aspect of the present disclosure to achieve the above-described objects, a soft magnetic iron-based powder includes, in percent by weight (wt %), more than 2% of Si, more than 0.02% of Al, more than 0.05% of Mn, more than 0% and less than 0.1% of O, and the balance being Fe and unavoidable impurities, includes an insulating layer including Si, Al, Mn, and O and formed on the outer surface thereof, and satisfies [Si]/[Al]>2, wherein [Si] and [Al] represent wt % of respective elements.

In addition, in each soft magnetic iron-based powder according to the present disclosure, a difference in [Si]+[Al]+[Mn] between $D_{10}$ and $D_{90}$ may be less than 10 wt %, wherein [Si], [Al], and [Mn] represent wt % of respective elements.

In addition, in each soft magnetic iron-based powder according to the present disclosure, an average particle size may be from 150 to 400 μm.

In each soft magnetic iron-based powder according to the present disclosure, $D_{95}$ may be less than 500 μm, and $D_{50}$ may be from 150 to 300 μm.

In accordance with another aspect of the present disclosure to achieve the above-described objects, a method for preparing a soft magnetic iron-based powder includes solidifying a molten steel comprising, in percent by weight (wt %), more than 2% of Si, more than 0.02% of Al, more than 0.05% of Mn, more than 0% and less than 0.1% of O, and the balance being Fe and unavoidable impurities by cooling the molten steel from 1500° C. to 1000° C. within 10 minutes, cooling the steel from 1000° C. to 900° C. within 100 minutes, liquefy the steel by heating; and atomizing the liquid steel to form powder, wherein in the solidifying operation, a ratio of surface area to volume of the molten steel is 4 $cm^{-1}$ or less.

In accordance with another aspect of the present disclosure to achieve the above-described objects, a soft magnetic component includes a soft magnetic iron-based powder comprising, in percent by weight (wt %), more than 2% of Si, more than 0.02% of Al, more than 0.05% of Mn, more than 0% and less than 0.1% of O, and the balance being Fe and unavoidable impurities and satisfying [Si]/[Al]>2; and an insulating layer including Si, Al, Mn, O and formed in an interface between particles the soft magnetic iron-based powder, wherein an iron loss at 1 T at 1000 Hz is at most 140 W/kg.

In addition, in each soft magnetic component according to the present disclosure, a thickness of the insulating layer may be from 10 to 50 nm.

In addition, in each soft magnetic component according to the present disclosure, a difference in [Si]+[Al]+[Mn] between $G_{10}$ and $G_{90}$ may be less than 10 wt %, wherein [Si], [Al], and [Mn] represent wt % of respective elements.

In addition, in each soft magnetic component according to the present disclosure, an area ratio of the soft magnetic iron-based powder having a major axis-to-minor axis ratio of 1 to 2 may be at least 50%.

In addition, in each soft magnetic component according to the present disclosure, an average particle size of the soft magnetic iron-based powder may be from 150 to 500 μm.

In addition, in each soft magnetic component according to the present disclosure, $G_{95}$ may be less than 500 μm, and $G_{50}$ may be from 150 to 300 μm.

In addition, in each soft magnetic component according to the present disclosure, an iron loss at 1 T at 400 Hz may be at most 40 W/kg.

In addition, in each soft magnetic component according to the present disclosure, a magnetic flux density ($B_{100}$) at 50 Hz at 10000 A/m may exceed 1.1 T.

In addition, in each soft magnetic component according to the present disclosure, a specific resistance may exceed 40 μΩ·cm.

Advantageous Effects

According to the present disclosure, provided are a soft magnetic iron-based powder having a low iron loss in a frequency range of 1000 Hz or less and a preparation method therefor, and a soft magnetic component.

In addition, according to the present disclosure, an iron-based powder including an insulating layer on the outer surface may be provided without using a separate insulating material.

BEST MODE

A soft magnetic iron-based powder according to the present disclosure may include, in percent by weight (wt %), more than 2% of Si, more than 0.02% of Al, more than 0.05% of Mn, more than 0% and less than 0.1% of O, and the balance being Fe and unavoidable impurities, include an insulating layer including Si, Al, Mn, and O and formed on the outer surface thereof, and satisfy [Si]/[Al]>2, wherein [Si] and [Al] represent wt % of respective elements.

MODES OF THE INVENTION

Hereinafter, preferred embodiments of the present disclosure will now be described. However, the present disclosure may be embodied in many different forms and should not be construed as being limited to the embodiments set forth herein. Rather, these embodiments are provided so that this disclosure will be thorough and complete, and will fully convey the scope of the disclosure to those skilled in the art.

The terms used herein are merely used to describe particular embodiments. Thus, an expression used in the singular encompasses the expression of the plural, unless it has a clearly different meaning in the context. In addition, it is to be understood that the terms such as "including" or "having" are intended to indicate the existence of features, steps, functions, components, or combinations thereof disclosed in the specification, and are not intended to preclude the possibility that one or more other features, steps, functions, components, or combinations thereof may exist or may be added.

Meanwhile, unless otherwise defined, all terms used herein have the same meaning as commonly understood by one of ordinary skill in the art to which this disclosure belongs. Thus, these terms should not be interpreted in an idealized or overly formal sense unless expressly so defined herein. As used herein, the singular forms are intended to include the plural forms as well, unless the context clearly indicates otherwise.

In addition, the terms "about", "substantially", etc. used throughout the specification mean that when a natural manufacturing and substance allowable error are suggested, such an allowable error corresponds a value or is similar to the value, and such values are intended for the sake of clear understanding of the present invention or to prevent an unconscious infringer from illegally using the disclosure of the present invention.

In addition, as used herein, the term "Dx" refers to an iron-based powder particle corresponding to x % cumulative particle size on the cumulative particle size distribution of iron-based powder particles, and x is a rational number greater than 0 and less than 100. In the case where x is, for example, 10, i.e., the iron-based powder particles correspond to 10% from the smallest particle size in the particle size measurement results of the iron-based powder.

As used herein, the term "Gy" refers to an iron-based powder particle contained in a component corresponding to y % cumulative particle size on the cumulative particle size distribution of iron-based powder particles in the component, and y is a rational number greater than 0 and less than 100. In the case where y is, for example, 10, the iron-based powder particles correspond to 10% form the smaller particle size in the particle size measurement results of the iron-based powder in the component.

The soft magnetic iron-based powder is the most important material to manufacture a soft magnetic component. The soft magnetic iron-based powder according to the present disclosure includes an insulating layer containing Si, Al, Mn, and O on the outer surface thereof. The insulating layer of the present disclosure is formed by slowly cooling an oxide layer disposed at an upper portion of a molten metal in a state being mixed with the powder while manufacturing the powder rather than using a conventional method of coating iron-based powder with a separate organic/inorganic insulating material. In consideration thereof, the present disclosure is advantageous in that the insulating layer may be formed on the outer surface of the iron-based powder without conducting conventional separate insulating coating.

According to an embodiment, a thickness of the insulating layer may be from 10 to 50 nm. When the thickness of the insulating layer is less than 10 nm, insulating properties are insufficient to increase the eddy current loss, thereby increasing the iron loss. When the thickness of the insulating layer exceeds 50 nm, the amount of oxygen in steel significantly increases, thereby deteriorating magnetic properties.

In addition, in order to further improve soft magnetic properties, it is important to control the particle size and elements thereof. The soft magnetic iron-based powder according to an embodiment may have an average particle size of 150 to 400 μm. When the average particle size is less than 150 μm, the hysteresis loss cannot be sufficiently lowered, thereby failing to sufficiently reduce the iron loss in a low frequency range of 1000 Hz or less. Meanwhile, when the average particle size exceeds 400 μm, the eddy current loss increases so that gaps between particles cannot be sufficiently narrowed during molding under high-temperature, high-pressure conditions, thereby decreasing a density of the component being manufactured. Preferably, the average particle size may exceed 200 μm, and under this condition, the hysteresis loss may sufficiently be lowered and the eddy current loss generated in each particle may not be significant. In addition, more preferably, the average particle size may be less than 300 μm, and under this condition, local stress concentrated in a component may be lowered while the powder particles are molded into the component under high-temperature and high-pressure conditions.

According to an embodiment of the present disclosure, $D_{95}$ may be less than 500 μm, and $D_{50}$ may be from 150 to 300 μm. When the $D_{95}$ is 500 μm or more, particles cannot receive a pressure equal to that applied to surrounding smaller particles during molding under high-temperature, high-pressure conditions and density decreases, thereby deteriorating magnetic properties. When the $D_{50}$ is less than 150 μm, uniform particle size required to minimize the iron loss in a frequency range of 1000 Hz or less cannot be obtained. When the $D_{50}$ exceeds 300 μm, the number of iron-based powder particles having particle sizes greater than those optimal for magnetic properties becomes a majority of particles of the total iron-based powder particles, thereby deteriorating magnetic properties.

The soft magnetic iron-based powder according to an embodiment of the present disclosure may include, in percent by weight (wt %), more than 2% of Si, more than 0.02% of Al, more than 0.05% of Mn, more than 0% and less than 0.1% of O, and the balance being Fe and unavoidable impurities. Hereinafter, reasons for numerical limitations on the contents of alloying elements in the embodiment of the present disclosure will be described.

The content of Si may exceed 2 wt %.

Si is an essential element for increasing specific resistance of the iron-based powder. According to the present disclosure, because the Si content exceeds 2 wt %, a ferrite phase may be maintained even during high-temperature molding, so that the particle size of the powder may be almost identical to the particle size of the powder contained in the component molded under the high-temperature and/or high-pressure conditions. In the case where the Si content is less than 2 wt %, the particle size of the powder may be significantly different from the particle size of the powder contained in the component molded under the high-temperature and/or high-pressure conditions and it is difficult to obtain an appropriate particle size of the powder.

The content of Al may exceed 0.02 wt %.

Al plays the same role as Si in increasing specific resistance of the iron-based powder. In addition, Al is actively added as an element appropriately adjusting amounts of other impurities to improve magnetic properties of the iron-based powder. In this regard, according to the present disclosure, Al may be added in an amount greater than 0.02 wt %. In order to control impurities such as O and S, it is preferable to add Al in an amount greater than 0.3 wt %.

The content of Mn may exceed 0.05 wt %.

Mn plays a role similar to that of Si in increasing specific resistance of the iron-based powder. In addition, Mn is actively added as an element forming an oxide and a sulfide and preventing the impurities contained in the iron-based powder from reducing the particle size to improve magnetic properties of the iron-based powder. In this regard, according to the present disclosure, Mn may be added in an amount greater than 0.05 wt %. In order to elute oxygen and sulfur contained in steel into an oxide or a sulfide, Mn may be added in an amount greater than 0.2 wt %.

The content of O may be greater than 0 wt % and less than 0.1 wt %.

O is an element whose content continuously increases while a high-temperature process is conducted in the manufacture of the iron-based powder. The smaller the O content in a final component prepared by high-temperature and/or high-pressure molding is, the more superior the magnetic properties are. According to the present disclosure, an upper limit of the O content is set to 0.1 wt %.

However, an appropriate amount of O binds to Si, Al, Mn, and the like on the surface of the iron-based powder to form an oxide layer having electrically insulating properties. According to the present disclosure, in the case of manufacturing a component using the iron-based powder including the insulating layer containing Si, Al, Mn, and O, a soft magnetic component having a reduced iron loss may be manufactured. In consideration thereof, the O content of the present disclosure exceeds 0 wt %.

According to the present disclosure, in addition to the above-described composition of the alloying elements, the following correlation among the alloying elements may be satisfied.

$$[Si]/[Al]>2$$

Here, [Si] and [Al] represent wt % of respective elements. Although Al increases specific resistance and lowers the S content, Al easily binds to O at a high temperature so as to cause a problem of increasing the O content during a process of manufacturing the iron-based powder. In this regard, as the Si content, relative to the Al content, increases, the increase in the O content by Al is easily inhibited. Also, when the Al content increases in the insulating layer containing Si, Al, Mn, and O on the surface of the iron-based powder, a problem of increasing the iron loss occurs. In order to solve the above-described problems, according to an embodiment of the present disclosure, the elements may be controlled such that the Si content exceeds twice the Al content.

According to an embodiment, a difference in [Si]+[Al]+[Mn] between $D_{10}$ and $D_{90}$ may be less than 10 wt %. In this regard, the [Si], [Al], and [Mn] represent wt % of the respective elements. Si, Al, and Mn, which significantly increase specific resistance, are effective on increasing specific resistance as the alloy thereof increases. However, in the case where the concentration thereof significantly varies in accordance with the particle size of the powder, magnetic properties may not be uniform in a soft magnetic component having a complex structure and inferior magnetic properties may be obtained in some portions compared to those of common materials.

The remaining element of the present disclosure is iron (Fe). However, unintended impurities may inevitably be incorporated from raw materials or surrounding environments during common manufacturing processes, and thus addition of other alloying elements is not excluded. Theses impurities are known to any person skilled in the art of manufacturing and details descriptions thereof are not specifically given in the present disclosure.

Hereinafter, technical significance of impurity elements and content ranges thereof will be described. However, the impurity elements and content ranges thereof described below are not essential to obtain the soft magnetic iron-based powder or the soft magnetic component of the present disclosure, and it is to be noted that the following descriptions are merely for illustrative purposes and technical ideas of the present disclosure are not limited thereto.

The content of C may be less than 0.01 wt %.

C is an element inevitably contained while the iron-based powder is manufactured. An excess of C forms precipitates and impedes movement of magnetic domain as an element adversely affecting magnetic properties. Therefore, it is preferable to control the C content to be less than 0.01 wt %. More preferably, when the C content is less than 0.004 wt %, the iron loss excellent and the iron loss is not deteriorate even annealing is performed at a low temperature below 300° C.

The content of N may be less than 0.01 wt %.

N is an element inevitably added while the iron-based powder is manufactured. An excess of N forms precipitates and impedes movement of magnetic domain as an element adversely affecting magnetic properties. Particularly, because N is present in a gaseous state at a high temperature to cause a problem of forming a gas burst in a steel, it is preferable to control the N content to be less than 0.01 wt %. More preferably, when the N content is less than 0.004 wt %, the iron loss excellent, and the iron loss is not deteriorate even annealing is performed at a low temperature below 300° C.

The content of S may be less than 0.05 wt %.

S is an element inevitably added while the iron-based powder is manufactured. An excess of S is liquefied into FeS at a high temperature to increase manufacturing difficulty and binds to Mn and Cu to form precipitates to impede movement of magnetic domain, as an element adversely affecting magnetic properties. Therefore, it is preferable to control the S content to be less than 0.05 wt %. Particularly, because an excess of S is segregated in grain boundaries to hinder interface stability, the S content may be controlled to be less than 0.01 wt %. More preferably, the S content may be controlled to be less than 0.003 wt % to reduce the iron loss.

The content of Ti may be less than 0.01 wt %.

Ti is an element inevitably added during the manufacture of the iron-based powder. An excess of Ti binds to oxygen while a molten steel is present in a liquid state at a high temperature to form a coarse oxide in the molten steel and form a carbide and a nitride which deteriorate magnetic properties even after a component is manufactured. Therefore, it is preferable to control the Ti content to be less than 0.01 wt %.

The content of Mg may be less than 0.05 wt %.

Mg is an element inevitably added while the iron-based powder is manufactured. An excess of Mg may bind to sulfur or oxygen while the molten steel is present in a liquid state at a high temperature to form inclusions in the molten steel and the inclusions grow to form an oxide and a sulfide which deteriorate magnetic properties even after the component is manufactured. Therefore, it is preferable to control the Mg content to be less than 0.05 wt %.

Hereinafter, a method for preparing the soft magnetic iron-based powder according to the present disclosure will be described in detail. In the method for preparing the iron-based powder according to the present disclosure, a method of solidify a high-temperature liquid phase by cooling may be used. It is generally expected that a composition does not considerably change in a liquid phase in the case where a solid metal compound is changed to the liquid phase, but the expectation is actually wrong. A composition in a liquid phase is determined by thermodynamic correlation among Si, Al, Mn, C, N, S, Ti, Mg, and the like in a state molten in the liquid phase. For example, when the Si content is high, attractive and/or repulsive forces among the elements considerably change by Si to increase changes in the elements in local areas in the liquefied molten steel. For example, while the liquefied molten steel is solidified by cooling, dendrite may grow inward from the surface by Si, Al, Mn, and the like. In an iron-based powder having dendrite, there is a concern of considerable difference in the components between the interface and the inside of the dendrite due to size and/or shape of the dendrite.

In the method for preparing the soft magnetic iron-based powder according to the present disclosure, changes in the composition of elements of the iron-based powder may be minimized. The method for preparing the soft magnetic iron-based powder according to the present disclosure may include solidifying a molten steel including, in percent by weight (wt %), more than 2% of Si, more than 0.02% of Al, more than 0.05% of Mn, more than 0% and less than 0.1% of O, and the balance being Fe and unavoidable impurities, by cooling the molten steel from 1500° C. to 1000° C. within 10 minutes, cooling the steel from 1000° C. to 900° C. within 100 minutes, liquefying the steel by heating, and atomizing the liquid steel to form powder. The method may further include deforming, physically cutting, crushing, and the like after the cooling operation.

According to an embodiment of the present disclosure, in the solidifying operation, a ratio of the surface area (S) to the volume (V) of the solidified molten steel may be at most 4 $cm^{-1}$. When the S/V ratio exceeds 4 $cm^{-1}$, a surface area that reacts with oxygen in the air at a high temperature to form a thick oxide layer is excessively enlarged. As a result, the formed oxide layer may be transferred to the inside along grain boundaries, and accordingly, an oxygen concentration in the steel significantly increases and there may be a risk of occurrence of deviation of alloying elements. Based thereon, the S/V ratio may preferably be at most 0.3 $cm^{-1}$, more preferably, at most 0.11 $cm^{-1}$. However, because the solidified molten steel is liquefied again by heating, the S/V ratio may be at least 0.08 $cm^{-1}$ in consideration liquefaction time.

The soft magnetic component according to the present disclosure may be prepared by compression molding the soft magnetic iron-based powder at a high temperature and/or a high pressure. The soft magnetic component according to an embodiment may include a soft magnetic iron-based powder including, in percent by weight (wt %), more than 2% of Si, more than 0.02% of Al, more than 0.05% of Mn, more than 0% and less than 0.1% of O, and the balance being Fe and unavoidable impurities and satisfying [Si]/[Al]>2, and an insulating layer including Si, Al, Mn, and O in the interface between particles of the soft magnetic iron-based powder. Reasons for limitations on the alloy composition of the iron-based powder are identical to those given above, and thus will be omitted for descriptive convenience.

The soft magnetic component according to the present disclosure includes the insulating layer containing Si, Al, Mn, and O and formed in the interface between particles of the soft magnetic iron-based powder. The insulating layer in the soft magnetic component may be obtained by compression molding the iron-based powder having the insulating layer on the outer surface without forming the above-described separate insulation coating.

According to an embodiment, the thickness of the insulating layer may be from 10 to 50 nm. In the case where the thickness of the insulating layer is less than 10 nm, and an eddy current loss may increase due to insufficient insulating properties, so that the iron loss may increase. In the case where the thickness of the insulating layer exceeds 50 nm, the amount of oxygen significantly increases in the steel, so that magnetic properties may deteriorate.

An average particle diameter of the soft magnetic iron-based powder contained in the soft magnetic component according to an embodiment of the present disclosure may be from 150 to 500 μm. In the case where the average particle size is less than 150 μm, a hysteresis loss cannot be sufficiently lowered, so that the iron loss may not be sufficiently reduced in a low frequency range of 1000 Hz or less. On the contrary, in the case where the average particle size exceeds 500 μm, a density of the component may decrease, so that magnetic properties may deteriorate.

According to an embodiment of the present disclosure, $G_{95}$ may be less than 500 μm, and $G_{50}$ may be from 150 to 300 μm. In the case where the $G_{95}$ is 500 μm or greater, the density of the component decreases, so that magnetic properties may deteriorate. In the case where the $G_{50}$ is less than 150 μm, uniform particle size required to minimize the iron loss in a frequency range of 1000 Hz or less may not be obtained. When the $G_{50}$ exceeds 300 μm, the number of iron-based powder particles having particle sizes greater than those optimal for magnetic properties becomes a majority of particles of the total iron-based powder particles, thereby deteriorating magnetic properties.

According to an embodiment, a difference in [Si]+[Al]+[Mn] between $G_{10}$ and $G_{90}$ may be less than 10 wt %, wherein [Si], [Al], and [Mn] represent wt % of respective elements. Si, Al, and Mn, which significantly increase specific resistance, are effective on increasing specific resistance as the alloy increases. However, in the case where the concentration thereof significantly varies in accordance with the particle size of the powder, magnetic properties may not be uniform in a soft magnetic component having a complex structure and inferior magnetic properties may be obtained in some portions compared to those of common materials.

In the soft magnetic component according to an embodiment of the present disclosure, an area ratio of the soft magnetic iron-based powder having a major axis-to-minor axis ratio of 1 to 2 may be at least 50%. When the major axis-to-minor axis ratio exceeds 2, the shape of the particles considerably deviate from a spherical shape, thereby causing a risk of deterioration in magnetic properties due to local variation of elements during the formation of powder.

The soft magnetic component according to the present disclosure may sufficiently reduce an iron loss in a frequency range of 1000 Hz or less. According to an embodiment, the iron loss at 1 T at 400 Hz may be at most 40 W/kg. According to another embodiment, the iron loss at 1 T at 1000 Hz may be at most 140 W/kg.

The soft magnetic component according to the present disclosure has excellent magnetic properties, and according to an embodiment, a magnetic flux density ($B_{100}$) at 50 Hz, 10000 A/m may exceed 1.1 T.

The soft magnetic component according to the present disclosure has a high specific resistance, and the specific resistance may exceed 40 μΩ·cm according to an embodiment.

Hereinafter, the present disclosure will be described in more detail through examples. However, it is necessary to note that the following examples are only intended to illustrate the present disclosure in more detail and are not intended to limit the scope of the present disclosure. This is because the scope of the present disclosure is determined by matters described in the claims and able to be reasonably inferred therefrom.

EXAMPLES

Steels having the compositions shown in Table 1 below were prepared as molten steels in a liquid state using a common converter. Subsequently, the molten steel in the liquid state was cast by solidifying via cooling from 1500° C. to 1000° C. within 10 minutes such that a ratio of a surface area S to a volume V reached 4 $cm^{-1}$. The cast half-finished product may be called slab, bar, or hot coil according to the shape or thickness thereof. Then, the half-finished product was cooled from 1000° C. to 900° C. within 100 minutes. Then, the cooled half-finished product was used as it is or subjected to additional processes such as transformation or physically cutting and crushing. Subsequently, the resultant was liquefied by heating at a temperature of 1500° C. or higher and atomized to form powder according to a common method to prepare the iron-based powder. In Table 1, [Si] and [Al] represent wt % of the respective elements.

TABLE 1

| | Composition (wt %) | | | | |
|---|---|---|---|---|---|
| | Si | A1 | Mn | O | [Si]/[A1] |
| Example 1 | 3.4 | 0.5 | 0.5 | <0.002 | 6.8 |
| Example 2 | 2.5 | 1.0 | 0.2 | <0.002 | 2.5 |
| Example 3 | 4.0 | 0.4 | 0.6 | <0.002 | 10.0 |

Average particle sizes and particle sizes $D_{95}$, $D_{50}$, $D_{90}$, and $D_{10}$ of the iron-based powder particles of each of the examples were measured and shown in Table 2 below. In addition, compositions of the alloying elements in the particles of $D_{90}$ and $D_{10}$ of each of the examples are shown in Table 3. In Table 3, [Si]+[Al]+[Mn] represents the sum of wt % of the elements.

TABLE 2

| | Particle size (μm) | | | | |
|---|---|---|---|---|---|
| | Average | D95 | D50 | D90 | D10 |
| Example 1 | 230 | 360 | 260 | 345 | 120 |
| Example 2 | 200 | 330 | 230 | 305 | 85 |
| Example 3 | 200 | 310 | 220 | 290 | 80 |

TABLE 3

| | | Composition of alloying elements (wt %) | | | |
|---|---|---|---|---|---|
| | | Si | A1 | Mr | [Si] + [A] + [Mn] |
| Example 1 | $D_{90}$ | 3.55 | 0.36 | 0.45 | 4.36 |
| | $D_{10}$ | 3.34 | 0.61 | 0.3 | 4.25 |
| Example 2 | $D_{90}$ | 2.0 | 1.2 | 0.5 | 3.7 |
| | $D_{10}$ | 2.7 | 1.1 | 0.1 | 3.9 |
| Example 3 | $D_{90}$ | 3.9 | 0.3 | 0.5 | 4.7 |
| | $D_{10}$ | 3.8 | 0.6 | 0.45 | 4.85 |

The iron-based powder of each example satisfying the composition of alloying elements and particle sizes defined in the present disclosure included the insulating layer containing Si, Al, Mn, and O on the outer surface, had an iron loss of 75 W/kg to 110 W/kg at 1 T at a frequency of 400 to 1000 Hz, and had a magnetic flux density $B_{100}$ of 1.0 to 1.5 T at 50 Hz at 10000 μm.

While the present disclosure has been particularly described with reference to exemplary embodiments, it should be understood by those of skilled in the art that the scope of the present disclosure is not limited thereby and various changes in form and details may be made without departing from the spirit and scope of the present disclosure.

INDUSTRIAL APPLICABILITY

According to the present disclosure, provided are a soft magnetic iron-based powder and a preparation method therefor, and a soft magnetic component which are applicable to various industrial fields such as a core of a motor.

The invention claimed is:

1. A soft magnetic iron-based powder comprising, in percent by weight (wt %), more than 2% of Si, more than 0.02% of Al, more than 0.05% of Mn, more than 0% and less than 0.1% of O, and the balance being Fe and unavoidable impurities, comprising an insulating layer including Si, Al, Mn, and O and formed on the outer surface thereof, wherein a thickness of the insulation layer is from 10 to 50 nm, and satisfying [Si]/[Al]>2, wherein [Si] and [Al] represent wt % of respective elements.

2. The soft magnetic iron-based powder according to claim 1, wherein a difference in [Si]+[Al]+[Mn] between $D_{10}$ and $D_{90}$ is less than 10 wt %, wherein [Si], [Al], and [Mn] represent wt % of respective elements.

3. The soft magnetic iron-based powder according to claim 1, wherein an average particle size is from 150 to 400 μm.

4. The soft magnetic iron-based powder according to claim 1, wherein $D_{95}$ is less than 500 μm, and $D_{50}$ is from 150 to 300 μm.

* * * * *